(12) United States Patent
Shimomura

(10) Patent No.: US 7,677,357 B2
(45) Date of Patent: Mar. 16, 2010

(54) MUFFLER AND VEHICLE EQUIPPED WITH MUFFLER

(75) Inventor: Kazuhiko Shimomura, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 116 days.

(21) Appl. No.: 11/617,529

(22) Filed: Dec. 28, 2006

(65) Prior Publication Data

US 2007/0158135 A1    Jul. 12, 2007

(30) Foreign Application Priority Data

Jan. 6, 2006    (JP)    ............................. 2006-001894
Jun. 23, 2006   (JP)    ............................. 2006-174461

(51) Int. Cl.
*F01N 1/08*    (2006.01)
(52) U.S. Cl. ....................... 181/249; 181/247; 181/248; 181/264
(58) Field of Classification Search ................. 181/247, 181/248, 249, 255, 264, 269
See application file for complete search history.

(56) References Cited

U.S. PATENT DOCUMENTS

| 1,732,818 | A | * | 10/1929 | Oldberg | ....................... | 181/264 |
| 1,876,861 | A | * | 9/1932 | Compo | ....................... | 181/264 |
| 1,881,051 | A | * | 10/1932 | Haas | ....................... | 181/264 |
| 2,675,088 | A | * | 4/1954 | McLeod | ....................... | 181/265 |
| 3,515,242 | A | * | 6/1970 | Lyttle | ....................... | 181/268 |
| 3,545,565 | A | * | 12/1970 | McCaffrey, Jr. | ....................... | 181/256 |
| 3,651,888 | A | * | 3/1972 | Andres | ....................... | 181/265 |
| 3,672,464 | A | * | 6/1972 | Rowley et al. | ....................... | 181/253 |
| 3,710,891 | A | * | 1/1973 | Flugger | ....................... | 181/256 |
| 4,094,644 | A | * | 6/1978 | Wagner | ....................... | 422/181 |
| 4,143,739 | A | * | 3/1979 | Nordlie | ....................... | 181/265 |
| 4,296,832 | A | * | 10/1981 | Kicinski | ....................... | 181/255 |
| 4,361,206 | A | * | 11/1982 | Tsai | ....................... | 181/255 |

(Continued)

FOREIGN PATENT DOCUMENTS

FR    2604747 A1    4/1988

(Continued)

OTHER PUBLICATIONS

European Search report for corresponding European application No. 06256595 lists the references above. The Search Report Examiner has provided comments on the relevancy of any non-English language references listed in the search report.

*Primary Examiner*—Jeffrey Donels
*Assistant Examiner*—Jeremy Luks
(74) *Attorney, Agent, or Firm*—Rabin & Berdo, PC

(57) ABSTRACT

A muffler that inhibits reduction in engine performance and reduces exhaust noise volume includes a conduit that passes through an expansion chamber. A partition wall is provided at a central section of the conduit. An upstream section upstream from the partition wall includes an outflow section that has a side surface in which outflow holes are formed that allow exhaust gas to flow out to the expansion chamber. A downstream section downstream from the partition wall has an inflow section that has a side surface formed with inflow holes that allow exhaust gas to flow in from the expansion chamber. An inner diameter of at least one section of the downstream section is smaller than an inner diameter of the outflow section.

6 Claims, 8 Drawing Sheets

U.S. PATENT DOCUMENTS

| | | | | |
|---|---|---|---|---|
| 4,367,808 A | * | 1/1983 | Oberg | 181/272 |
| 4,371,053 A | * | 2/1983 | Jones | 181/249 |
| 4,487,289 A | * | 12/1984 | Kicinski et al. | 181/252 |
| 4,550,799 A | * | 11/1985 | Flugger | 181/244 |
| 4,574,913 A | * | 3/1986 | Fukuda | 181/231 |
| 4,792,014 A | * | 12/1988 | Shin-Seng | 181/280 |
| 5,227,593 A | * | 7/1993 | Takahashi et al. | 181/255 |
| 5,248,859 A | | 9/1993 | Borla | |
| 5,496,975 A | * | 3/1996 | Wagner | 181/269 |
| 5,602,368 A | * | 2/1997 | Kaneso | 181/255 |
| 5,663,537 A | | 9/1997 | Ko et al. | |
| 5,892,186 A | * | 4/1999 | Flugger | 181/252 |
| 5,979,583 A | * | 11/1999 | Amino et al. | 180/219 |
| 6,082,487 A | * | 7/2000 | Angelo et al. | 181/256 |
| 6,832,665 B2 | * | 12/2004 | Crombeen | 181/275 |
| 6,880,670 B2 | * | 4/2005 | Dondi | 181/269 |
| 2002/0112915 A1 | | 8/2002 | Price | |

FOREIGN PATENT DOCUMENTS

| | | |
|---|---|---|
| GB | 1354551 A | 5/1974 |
| GB | 2371334 A | 7/2002 |
| JP | 2005-090237 | 4/2005 |

* cited by examiner

[Fig. 1]
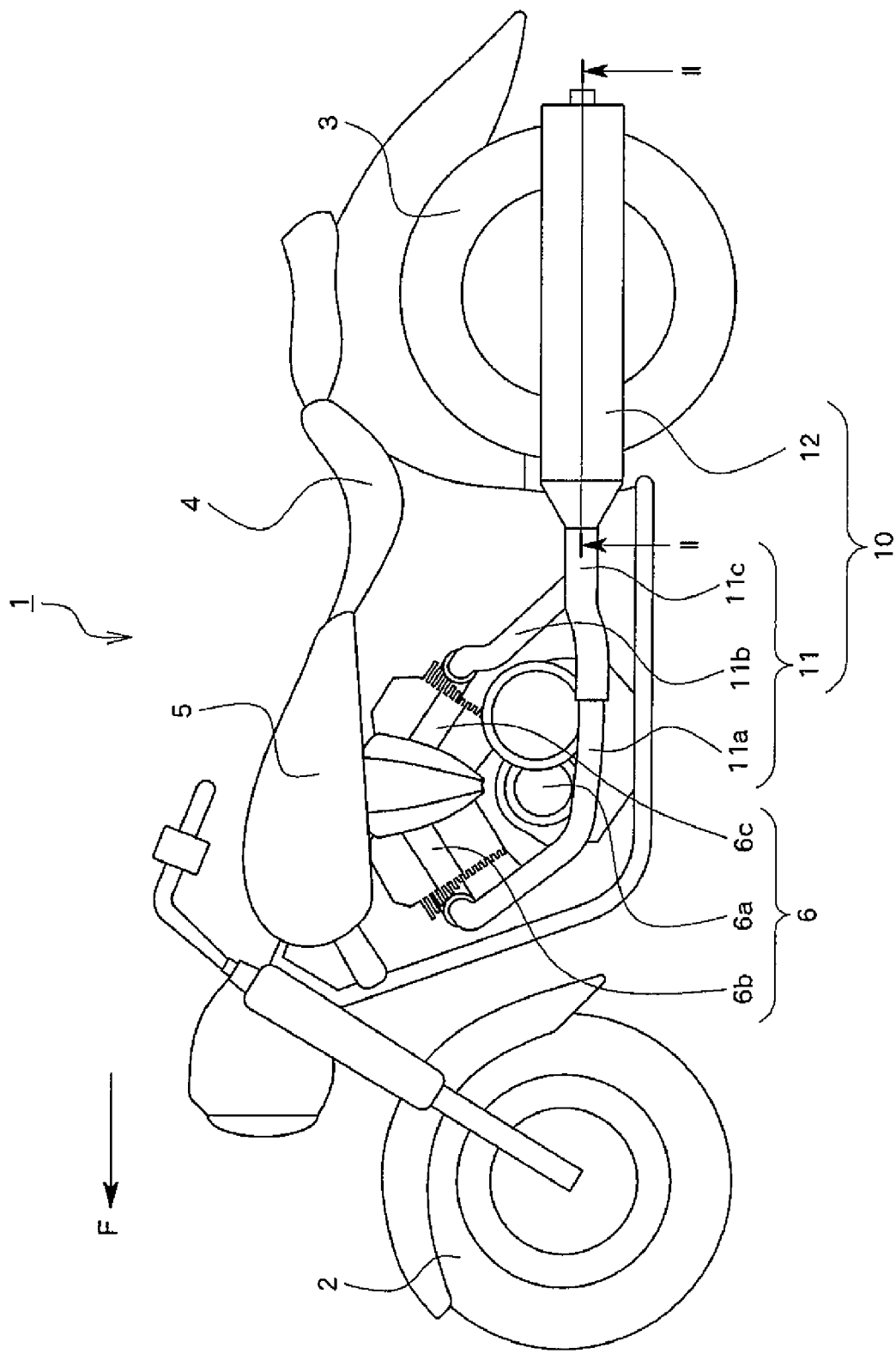

[Fig. 2]
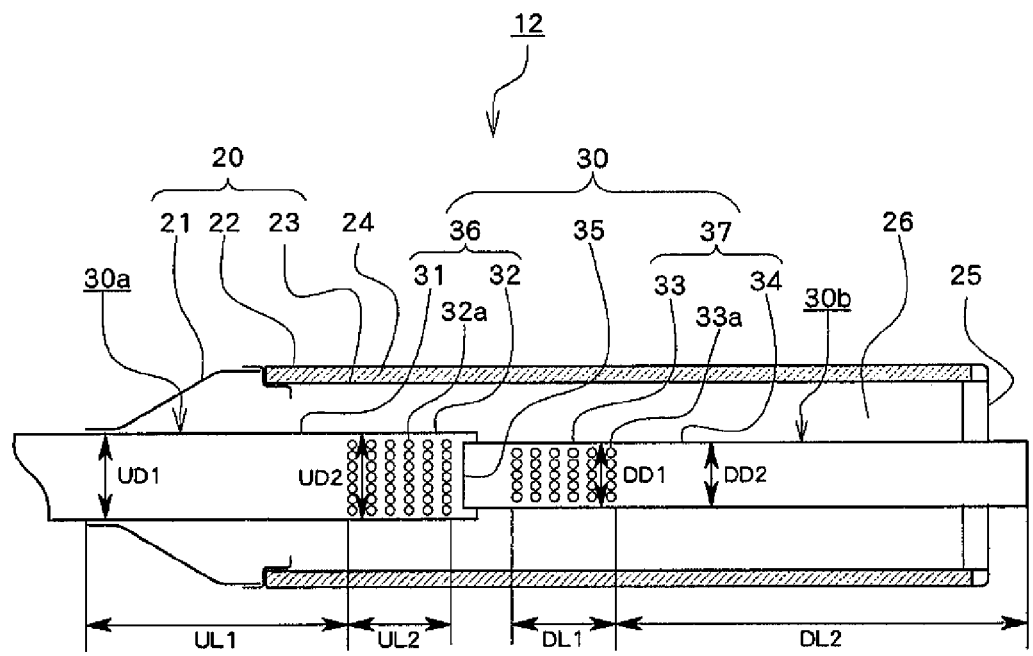

[Fig. 3]
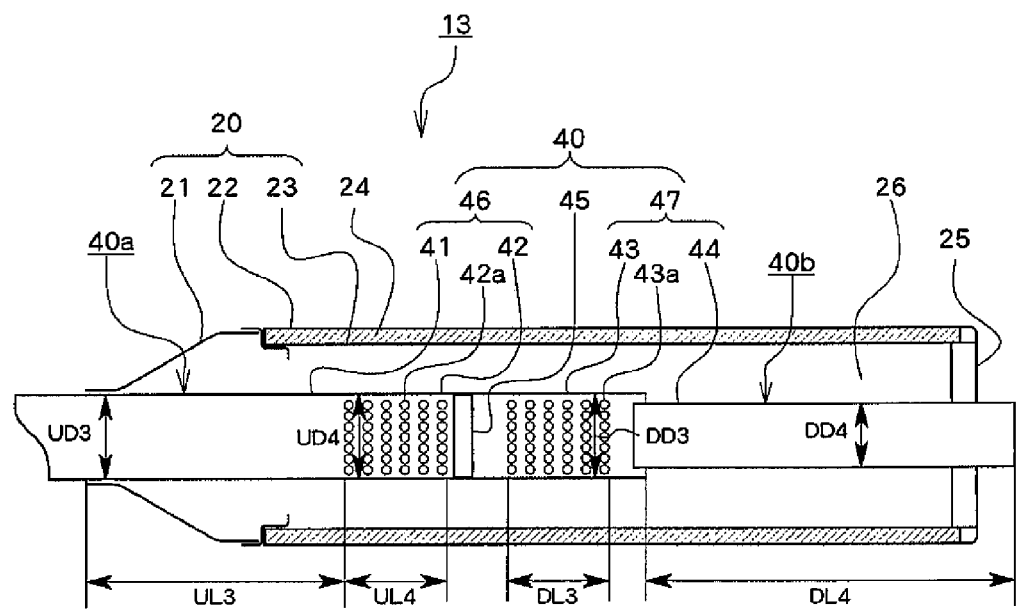

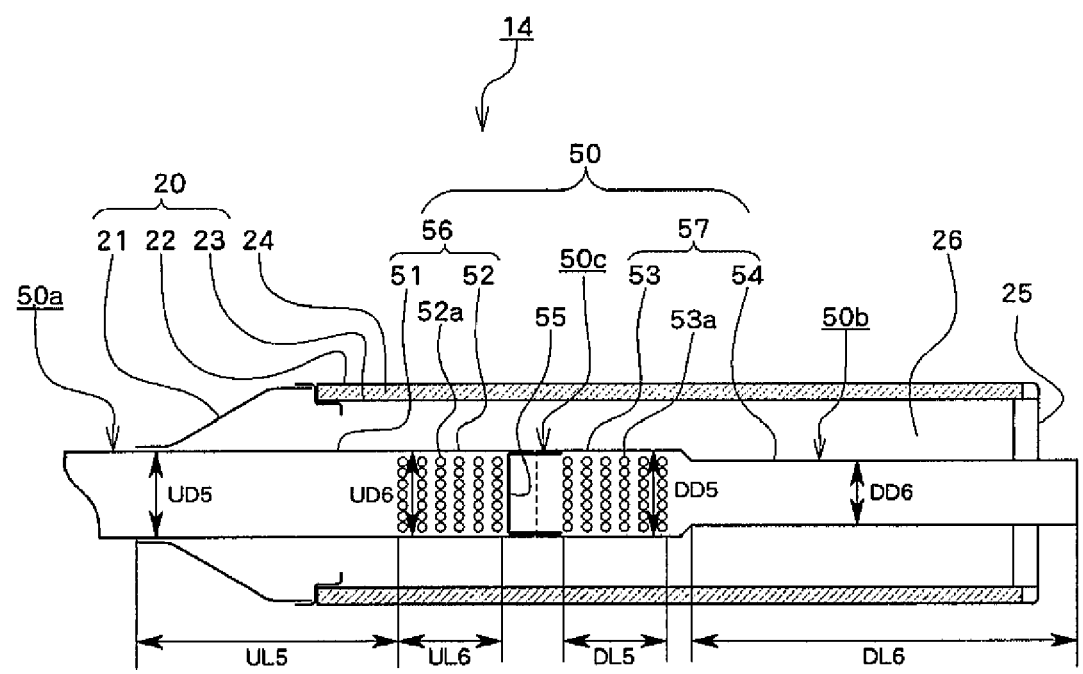
[Fig. 4]

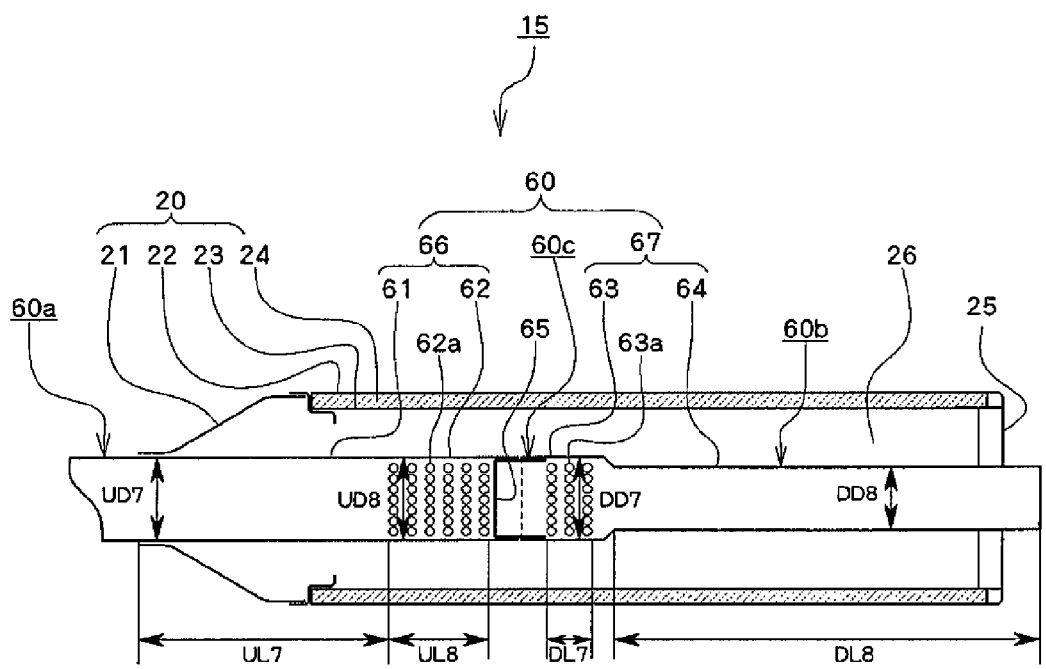
[Fig. 5]

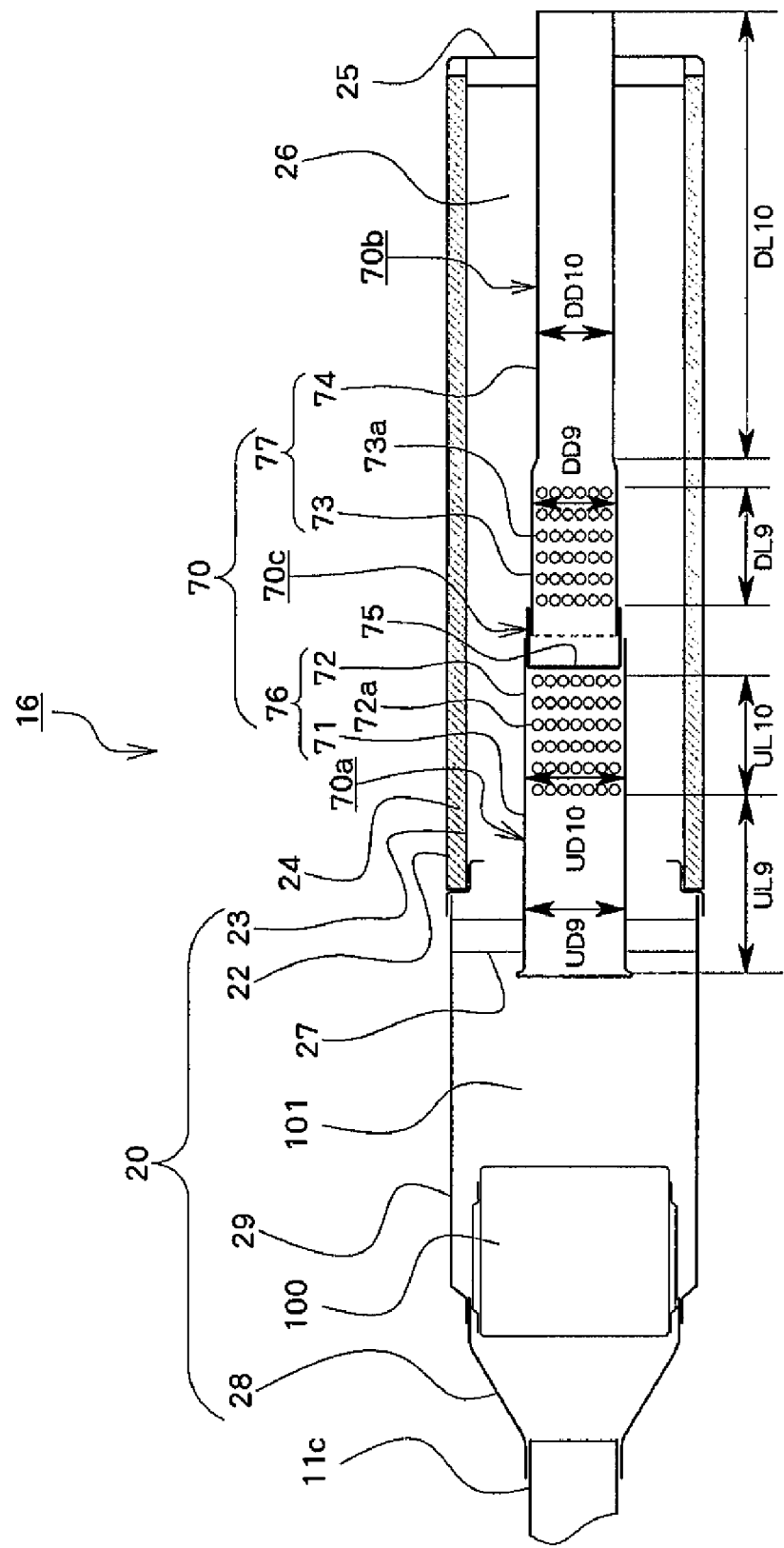
[Fig. 6]

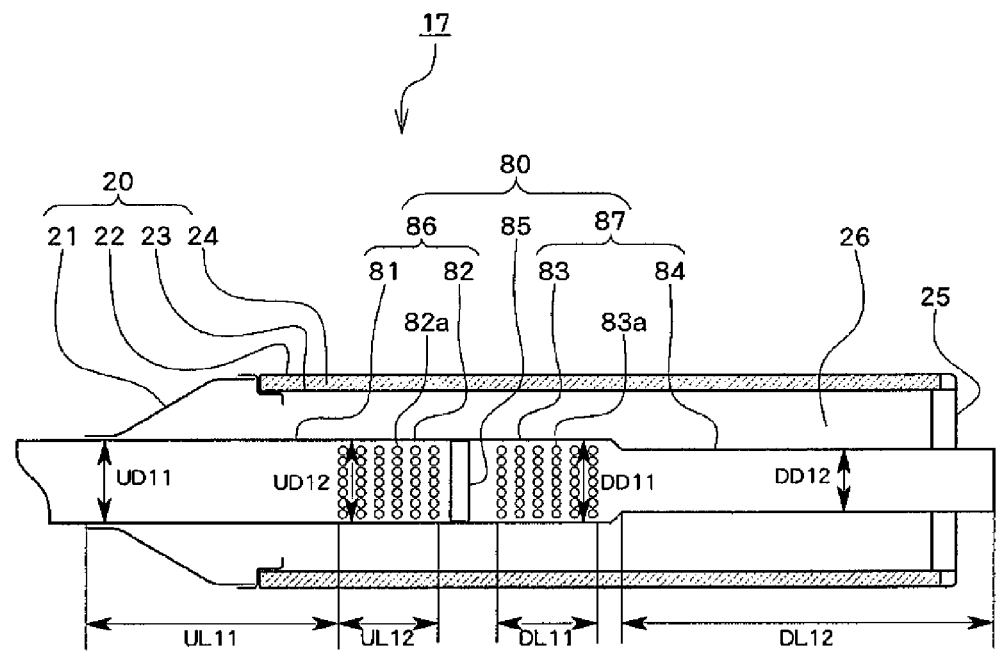
[Fig. 7]

[Fig. 8]
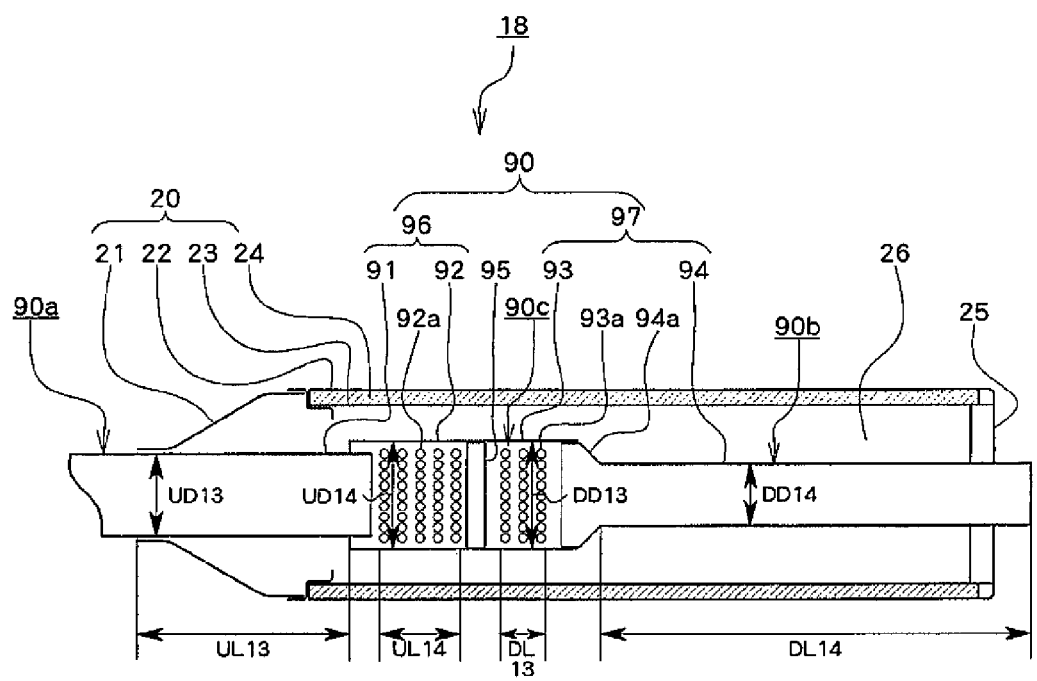

MUFFLER AND VEHICLE EQUIPPED WITH MUFFLER

RELATED APPLICATIONS

This application claims the benefit of priority under 35 USC 119 of Japanese patent application no. 2006-001894, filed on Jan. 6, 2006, and Japanese patent application no. 2006-174461, filed on Jun. 23, 2006, which applications are hereby incorporated by reference in their entireties.

BACKGROUND OF THE INVENTION

1. Field of the Invention

The present invention relates to a muffler that inhibits reduction in engine performance and reduces exhaust noise volume.

2. Description of Related Art

A conventional muffler has a conduit that passes through an expansion chamber. Exhaust gas from an engine flows out to the expansion chamber from holes formed in a side surface of an upstream section of the conduit, then flows in to the conduit again through holes formed in a side surface of downstream section of the conduit, and finally is exhausted to the open air from a downstream end of the conduit.

A motorcycle equipped with such a muffler can reduce unpleasant noise and generate a pleasant exhaust sound. Thus, a rider of the motorcycle can enjoy the exhaust sound generated by the muffler in addition to the engine noise (see, for example, JP-A-2005-90237 (FIG. 3)).

However, because attention has been focused on achieving a pleasant exhaust sound, not enough consideration has been given to reducing exhaust noise volume. The inventor has completed repeated diligent investigations concerning this matter and has found that if, in a conduit that passes through an expansion chamber, the inner diameter of a section of the conduit that is formed with holes that allow exhaust gas to flow out to the expansion chamber is made smaller, exhaust noise volume is reduced but the flow of exhaust gas when it flows out to the expansion chamber from the conduit is made worse. As a result, engine performance is reduced.

SUMMARY OF THE INVENTION

The invention addresses this issue and provides a muffler that inhibits reduction in engine performance and at the same time reduces exhaust noise volume.

A muffler according to a first aspect of the invention includes a conduit that passes through an expansion chamber. A partition wall is provided in a central section of the conduit. An upstream section upstream from the partition wall includes an outflow section that has a side surface in which outflow holes are formed that allow exhaust gas to flow out to the expansion chamber. A downstream section downstream from the partition wall has an inflow section that has a side surface formed with inflow holes that allow exhaust gas to flow in from the expansion chamber. An inner diameter of at least one section of the downstream section is smaller than an inner diameter of the outflow section.

The muffler according to the invention inhibits reduction in engine performance and at the same time reduces exhaust noise volume. More specifically, in the conduit that passes through the expansion chamber, the inner diameter of the at least one section of the downstream section is smaller than the inner diameter of the outflow section. As a result, engine performance is not impaired by hindrance of the flow of exhaust gas from the outflow holes of the outflow section to the expansion chamber. In addition, exhaust noise volume is reduced. Accordingly, generation of unpleasant noise is inhibited while a pleasant exhaust sound with a reduced volume is generated.

In one embodiment, the at least one section of the downstream section is downstream from the inflow section. Because the inner diameter of the conduit in the inflow section is not restricted, the flow of exhaust gas from the expansion chamber to the inflow holes of the inflow section is not hindered. Thus, engine performance reduction is reliably inhibited, and exhaust noise volume is reduced.

In another embodiment, the inner diameter of the outflow section is equal to or larger than an inner diameter of a section upstream from the outflow section of the upstream section. In this structure the surface area of the side surface that is used for forming outflow holes is reliably increased per axial direction unit length of the outflow section. Thus, engine performance is reliably inhibited from being reduced by hindrance of the flow of exhaust gas from the outflow holes to the expansion chamber, and exhaust noise volume is reduced.

In another embodiment, the length of the at least one section of the downstream section is equal to or greater than the combined length of the outflow section and the inflow section. In this structure, in the downstream section, the section with the inner diameter that is smaller than the inner diameter of the outflow section has a longer length. As a result, reduction of engine performance is inhibited and exhaust noise volume is effectively reduced.

A vehicle equipped with a muffler according to the invention inhibits reduced engine performance and reduces exhaust noise volume. Generation of unpleasant noise is reduced while a pleasant exhaust sound with a reduced volume is generated. As a result, a rider can enjoy the exhaust sound in addition to the engine sound. The invention is not limited to a particular vehicle and may be a motorcycle (including mopeds (scooters)), a four wheel buggy (all-terrain vehicle), a snowmobile, or the like.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to the invention.

FIG. 2 is a cross sectional view of a muffler according to a first embodiment of the invention.

FIG. 3 is a cross sectional view of a muffler according to a second embodiment of the invention.

FIG. 4 is a cross sectional view of a muffler according to a third embodiment of the invention.

FIG. 5 is a cross sectional view of a muffler according to a fourth embodiment of the invention.

FIG. 6 is a cross sectional view of a muffler according to a fifth embodiment of the invention.

FIG. 7 is a cross sectional view of a muffler according to a sixth embodiment of the invention.

FIG. 8 is a cross sectional view of a muffler according to a seventh embodiment of the invention.

DETAILED DESCRIPTION OF THE INVENTION

Embodiments of the invention are now described with reference to the drawings. Each embodiment is described in the context of a motorcycle as an examplary vehicle according to the invention.

First Embodiment

FIG. 1 is a side view of a motorcycle 1 according to a first embodiment of the invention. Motorcycle 1 includes a front wheel 2 and a rear wheel 3 that are rotatably supported by a vehicle body; a seat 4; a fuel tank 5; and an engine 6 that drives rear wheel 3. Engine 6 is a 4-stroke, V-type, 2 cylinder engine that has a crank case 6a, and a front cylinder head section 6b and a rear cylinder head section 6c that incline, respectively, upward and forward (the direction indicated by arrow F in FIG. 1) and upward and rearward from crank case 6a. Injectors (not shown) and throttle values (not shown) that supply, respectively, fuel to engine 6 and air that mixes with the fuel are connected to intake ports (not shown) of front and rear cylinder head sections 6b and 6c. Engine 6 generates driving force by combusting the fuel.

A muffler 10 exhausts exhaust gas from engine 6 and muffles exhaust noise. An upstream end of muffler 10 is connected to exhaust ports (not shown) of front and rear cylinder head sections 6b and 6c. Muffler 10 has an exhaust pipe 11 and a muffler body 12. Exhaust pipe 11 includes a front exhaust pipe 11a and a rear exhaust pipe 11b that extend rearward from the connecting section with the exhaust ports; and an exhaust pipe downstream end section 11c where a downstream section of front exhaust pipe 11a and a downstream section of rear exhaust pipe 11b merge. Muffler body 12 is connected to and extends rearward from the downstream end of exhaust pipe downstream end section 11c.

Exhaust gas from engine 6 flows from combustion chambers of front and rear cylinder head sections 6b and 6c, along front and rear exhaust pipes 11a and 11b and into exhaust pipe downstream end section 11c. Then, the exhaust gas is introduced to muffler body 12 and exhausted in to the open air from a downstream end of muffler body 12.

FIG. 2 is a cross sectional view of muffler body 12 taken through line II-II of FIG. 1. Muffler body 12 has a body section 20 and a single conduit 30. A single expansion chamber 26 is provided inside body section 20, and conduit 30 passes through the entire body section 20 in a longitudinal direction from an upstream end to a downstream end thereof.

An upstream section of body section 20 forms a taper section 21. The upstream end of taper section 21 is connected by welding to a side surface of conduit 30 to block the upstream end of expansion chamber 26. The inner diameter of taper section 21 increases downstream from its connection to conduit 30. An outer tubular section 22 extends from the downstream end of taper section 21. An inner tubular section 23 with an outer diameter smaller than the inner diameter of outer tubular section 22 is also downstream of taper section 21. Thus, a double pipe comprised of outer tubular section 22 and inner tubular section 23 is connected to the downstream end of the taper section 21. A sound insulating material layer 24 is provided between outer tubular section 22 and inner tubular section 23. The sound insulating material layer 24 comprises a sound insulating material like glass wool. In other words, the outside diameter of expansion chamber 26 is surrounded by sound insulating material layer 24. A plurality of perforations (not shown) are formed in a side surface of inner tubular section 23, and sound insulating material layer 24 is exposed to the inside of expansion chamber 26 via the holes. A round tubular cover section 25 is attached by welding to the downstream end of body section 20, namely, the downstream ends of outer and inner tubular sections 22 and 23, to seal the downstream end of expansion chamber 26.

Conduit 30 extends linearly inside expansion chamber 26. The upstream end of conduit 30 passes through the upstream end of taper section 21 to the outside of expansion chamber 26, and is connected to exhaust pipe downstream end section 11c (FIG. 1). The downstream end of conduit 30 passes through cover section 25 and opens to the open air outside expansion chamber 26.

A partition wall 35 is provided in a central section of conduit 30 that blocks flow of exhaust gas in the longitudinal direction inside conduit 30.

In an upstream section 36 of conduit 30 upstream from partition wall 35, there is an outflow section 32 that has a side surface formed with a plurality of outflow holes 32a. Outflow holes 32a allow exhaust gas introduced in to upstream section 36 from exhaust pipe downstream end section 11c (refer to FIG. 1) to outflow to expansion chamber 26.

In addition, in a downstream section 37 of conduit 30 downstream from partition wall 35, there is an inflow section 33 that has a side surface formed with a plurality of inflow holes 33a. Inflow holes 33a allow exhaust gas, which has flowed out to expansion chamber 26 from upstream section 36 via outflow holes 32a, to flow in to downstream section 37.

Partition wall 35 is positioned in conduit 30 between outflow section 32 and inflow section 33. Outflow and inflow holes 32a and 33a are circular with same diameters, and are positioned regularly at predetermined intervals in the longitudinal and circumferential directions of outflow and inflow sections 32 and 33.

One of the key features of the invention is that a section of conduit 30 downstream from outflow section 32 has a smaller inner diameter than that of outflow section 32. As shown in FIG. 2, a tail section 34 downstream from inflow section 33 has an inner diameter DD2 that is smaller than inner diameter UD2 of outflow section 32. Tail section 34 leads exhaust gas, which has flown in to downstream section 37 via inflow holes 33a from expansion chamber 26, to the open air. The side surface of tail section 34 is not formed with holes like outflow and inflow holes 32a and 33a. The downstream end of tail section 34 protrudes to the downstream side of muffler body 12 from cover section 25 and is formed with an opening from which exhaust gas is exhausted to the open air.

Inner diameter DD1 of inflow section 33 is equal to inner diameter DD2 of tail section 34, and thus is also smaller than inner diameter UD2 of outflow section 32. Accordingly, the inner diameter of downstream section 37, which includes inflow section 33 and tail section 34, is a constant and smaller size than inner diameter UD2 of outflow section 32.

Inner diameter UD2 of outflow section 32 is equal to inner diameter UD1 of head section 31, which is the section of upstream section 36 upstream from outflow section 32. Accordingly, inner diameter DD1 of inflow section 33 and inner diameter DD2 of tail section 34 are smaller than inner diameter UD1 of head section 31. The upstream end of head section 31 is connected to and receives exhaust gas from exhaust pipe downstream end section 11c (FIG. 1), and guides the exhaust gas to outflow section 32 at its downstream side. The side surface of head section 31 is not formed with holes like inflow and outflow holes 32a and 33a.

With this configuration, the inner diameter of upstream section 36 is maintained without size reduction from the upstream end of upstream section 36 to partition wall 35, and the inner diameter of downstream section 37 is smaller than the inner diameter of outflow section 32 of upstream section 36.

Since inner diameter UD2 of outflow section 32 is not smaller than inner diameter UD1 of head section 31, the flow of exhaust gas from outflow holes 32a in the side surface of outflow section 32 to expansion chamber 26 is not hindered, and thus the performance of engine 6 is not reduced. Further, since inner diameter DD1 of inflow section 33 and inner diameter DD2 of tail section 34 are smaller than inner diameter UD1 of head section 31 and inner diameter UD2 of outflow section 32, exhaust noise is effectively reduced.

In the longitudinal direction of conduit 30, the length DL2 of tail section 34 is larger than the combined length of outflow section 32 (UL2) and inflow section 33 (DL1). The length DL2 of tail section 34 is larger than the length UL1 of head section 31. The length DL1 of inflow section 33 is equal to the length UL2 of outflow section 32.

Conduit 30 is structured by connecting two pipe-shaped members, namely, upstream passage 30a including head section 31 and outflow section 32; and downstream passage 30b including partition wall 35, inflow section 33 and tail section 34. Thus, upstream section 36 and downstream section 37 of conduit 30 are pipe-shaped members that are formed as separate units from each other. The inner diameter of upstream passage 30a is the same as inner diameter UD1 of head section 31 and inner diameter UD2 of outflow section 32, and is constant throughout the longitudinal direction of upstream passage 30a. The inner diameter of downstream passage 30b is the same as inner diameter DD1 of inflow section 33 and inner diameter DD2 of tail section 34, and is constant throughout the longitudinal direction of downstream passage 30b. The downstream end of upstream passage 30a is open, while the upstream end of downstream passage 30b is a circular tubular bottomed surface that forms partition wall 35. The upstream end of downstream passage 30b provided with partition wall 35 is inserted in the opening at the downstream end of upstream passage 30a, and the downstream end of upstream passage 30a and the upstream end of downstream passage 30b are connected together by welding. Exhaust gas from engine 6 flows into head section 31 of upstream section 36 of the conduit 30 from exhaust pipe downstream end section 11c (FIG. 1), is led within upstream section 36 to outflow section 32, passes through outflow holes 32a formed in outflow section 32, and then flows in to expansion chamber 26. Then, the exhaust gas passes through inflow holes 33a of inflow section 33, flows into downstream section 37, and having passed inside tail section 34 is exhausted to the open air from the downstream end of tail section 34.

Second Embodiment

FIG. 3 is a cross sectional view of a muffler body 13 according to a second embodiment. Muffler body 13 is equipped to a motorcycle having structural members that are the same as in motorcycle 1 (FIG. 1), and thus a repeated explanation of these structural elements is omitted. Further, structural elements of muffler body 13 that are the same as those of muffler body 12 (FIG. 2) are denoted with the same reference numerals and a repeated explanation is omitted.

Muffler body 13 has a single conduit 40 that extends linearly through single expansion chamber 26. Conduit 40 is structured from two pipe-shaped members that are connected, namely, an upstream passage 40a and a downstream passage 40b. Upstream passage 40a includes a head section 41, an outflow section 42 having a side surface formed with outflow holes 42a, and an inflow section 43 having a side surface formed with inflow holes 43a. Downstream passage 40b has a tail section 44. A partition wall 45, which has a round tubular shape and is formed separately from upstream passage 40a, is attached by welding to a central section of upstream passage 40a between outflow section 42 and inflow section 43. More specifically, section 46 upstream from partition wall 45 and inflow section 43 of section 47 downstream from partition wall 45 are formed as an integrated unit, and tail section 34 of downstream section 47 is formed separately. The downstream end of upstream passage 40a and the upstream end of downstream passage 40b are each open. The outer diameter of the upstream end of downstream passage 40b and the inner diameter of the opening of the downstream end of upstream passage 40a are substantially equal. The upstream end of downstream passage 40b is inserted in the opening of the downstream end of upstream passage 40a, with the downstream end of upstream passage 40a and the upstream end of downstream passage 40b being connected by welding.

The inner diameter of upstream passage 40a is constant throughout the longitudinal direction thereof. That is, inner diameter UD3 of head section 41 that is the inner diameter of upstream section 46, inner diameter UD4 of outflow section 42, and inner diameter DD3 of inflow section 43 in downstream section 47 are equal. The inner diameter of downstream passage 40b has a constant and smaller size than the inner diameter of upstream passage 40a. That is, inner diameter DD4 of tail section 44 in downstream section 47 is constant and smaller than inner diameter UD3 of head section 41, inner diameter UD4 of outflow section 42, and inner diameter DD3 of inflow section 43. The length DL4 of tail section 44 in the longitudinal direction of conduit 40 is larger than the combined length of outflow section 42 (UL4) and inflow section 43 (DL3). The length DL4 of tail section 44 is longer than the length UL3 of head section 41. The length DL3 of inflow section 43 is equal to the length UL4 of outflow section 42.

With this configuration, the inner diameter from upstream section 46 to inflow section 43 of downstream section 47 is maintained without size reduction. Only the inner diameter of tail section 44 at the downstream side of inflow section 43 is smaller as compared to the inner diameter of outflow section 43.

Accordingly, in addition to there being no hindrance of the flow of exhaust gas from upstream section 46 to expansion chamber 26, there is also no hindrance of the flow of exhaust gas from expansion chamber 26 to the downstream section 47. Reduced engine performance is thereby inhibited and exhaust noise volume is reduced.

Third Embodiment

FIG. 4 is a cross sectional view of a muffler body 14 according to a third embodiment. Muffler body 14 is equipped to a motorcycle having structural members that are the same as in motorcycle 1 FIG. 1), and thus a repeated explanation of these structural elements is omitted. Further, structural elements of muffler body 14 that are the same as those of muffler body 12 (FIG. 2) are denoted with the same reference numerals and a repeated explanation is omitted.

Muffler body 14 has a single conduit 50 that extends linearly through single expansion chamber 26. Conduit 50 is structured by three inter-connecting members, namely, an upstream passage 50a, a downstream passage 50b, and a connecting section 50c. Upstream passage 50a includes a head section 51 and an outflow section 52 having a side surface formed with outflow holes 52a. Downstream passage 50b has an inflow section 53 having a side surface formed with inflow holes 53a, and a tail section 54. Connecting section 50c is formed separately from upstream passage 50a and downstream passage 50b and has a round tubular shape with a bottom section that forms a partition wall 55. In other words, in conduit 50, an upstream section 56 upstream from partition wall 55, a downstream section 57 downstream from partition wall 55, and partition wall 55 are formed as separated units. The downstream end of upstream passage 50a and the upstream end of downstream passage 50b are open, and the openings have equal inner diameters. Connecting section 50c is blocked at its upstream end by partition wall 55, and is open at its downstream end. The upstream and downstream ends of connecting section 50c have equal outer diameters that are substantially the same as the inner diameters of the openings of the downstream end of upstream passage 50a and the upstream end of downstream passage 50b.

The upstream end of connecting section 50c is inserted in the opening of the downstream end of upstream passage 50a. The downstream end of upstream passage 50a and partition wall 55 of connecting section 50c are attached by welding. The downstream end of connecting section 50c that is open is inserted in the upstream end of downstream passage 50b. The downstream end of connecting section 50c and the upstream end of downstream passage 50b are connected by welding.

The inner diameter of upstream passage 50a is constant throughout the longitudinal direction thereof. That is, inner diameter UD5 of head section 51 and inner diameter UD6 of outflow section 52 are equal. In downstream passage 50b, inner diameter DD5 of inflow section 53 is equal to inner diameter UD5 of head section 51 and inner diameter UD6 of outflow section 52. In contrast, in downstream passage 50b, inner diameter DD6 of tail section 54 downstream from inflow section 53 is smaller than the inner diameters at its upstream side, namely, inner diameter UD5 of head section 51, inner diameter UD6 of outflow section 52, and inner diameter DD5 of inflow section 53. The outer diameter of connecting section 50c is constant throughout the longitudinal direction thereof, and inner diameter UD6 of outflow section 52 and inner diameter DD5 of inflow section 53 are substantially equal. The length DL6 of tail section 54 is larger than the combined length of outflow section 52 (UL6) and inflow section 53 (DL5). The length DL6 of tail section 54 is longer than the length UL5 of head section 51. The length DL5 of inflow section 53 is equal to the length UL6 of outflow section 52.

With this configuration, the inner diameter from the upstream section 56 to inflow section 53 of downstream section 57 is maintained without size reduction. Only the inner diameter of tail section 54 downstream from inflow section 53 is smaller than that of outflow section 53.

Fourth Embodiment

FIG. 5 is a cross sectional view of a muffler body 15 according to a fourth embodiment. Muffler body 15 is equipped to a motorcycle having structural members that are the same as in motorcycle 1 (FIG. 1), and thus a repeated explanation of these structural elements is omitted. Further, structural elements of muffler body 15 that are the same as those of muffler body 12 (FIG. 2) are denoted with the same reference numerals and a repeated explanation is omitted.

Muffler body 15 has a single conduit 60 that extends linearly through single expansion chamber 26. Like muffler body 14 of FIG. 4, conduit 50 is structured by three interconnecting members, namely, an upstream passage 60a, a downstream passage 60b, and a connecting section 60c. Upstream passage 60a has a head section 61 and an upstream section 66 having an outflow section 62 with a side surface formed with outflow holes 62a. Downstream passage 60b has an inflow section 63 having a side surface formed with inflow holes 63a, and a downstream section 67 having a tail section 64. Connecting section 60c is formed separately from upstream passage 60a and downstream passage 60b and has a round tubular shape with a bottom section that forms a partition wall 65.

Inner diameter UD7 of head section 61 of upstream passage 60a, and inner diameter UD8 of outflow section 62, and inner diameter DD7 of inflow section 63 of downstream passage 60b are equal. In contrast, in downstream passage 60b, inner diameter DD8 of tail section 64 downstream from inflow section 63 is smaller than the inner diameters upstream from tail section 64, namely, inner diameter UD7 of head section 61, inner diameter UD8 of outflow section 62, and inner diameter DD7 of inflow section 63.

In the longitudinal direction of conduit 60, the length DL8 of tail section 64 is larger than the combined length of outflow section 62 (UL8) and inflow section 63 (DL7). The length DL8 of tail section 64 is longer than the length UL7 of head section 61. Further, the length DL7 of inflow section 63 is smaller than the length UL8 of outflow section 62. As a result, the length DL8 of tail section 64 of conduit 60 is larger than the length DL6 of tail section 54 of conduit 50 (FIG. 4). Accordingly, exhaust noise is suppressed even more effectively.

Fifth Embodiment

FIG. 6 is a cross sectional view of a muffler body 16 according to a fifth embodiment. Muffler body 16 is equipped to a motorcycle having structural members that are the same as in motorcycle 1 (FIG. 1), and thus a repeated explanation of these structural elements is omitted. Further, structural elements of muffler body 16 that are the same as those of muffler body 12 (FIG. 2) are denoted with the same reference numerals and a repeated explanation is omitted.

The upstream end of body section 20 of muffler body 16 is connected to exhaust pipe downstream end section 11c, and has a taper section 28 with an inner diameter that increases downstream from the connection to exhaust pipe section 11c; an extending section 29 that has a round tubular shape and is connected to the downstream end of taper section 28; and outer tubular section 22 and inner tubular section 23 forming a double pipe that is connected to the downstream end of extending section 29. Sound insulating material layer 24 is provided between outer tubular section 22 and inner tubular section 23.

A partition 27 that has a round tubular shape and that blocks flow of exhaust gas in the longitudinal direction inside body section 20 is provided at a central section of body section 20. Expansion chamber 26 is provided downstream from partition 27, and has its upstream and downstream ends respectively blocked by partition 27 and cover section 25. A front chamber 101 upstream from partition 27 has its upstream and downstream ends blocked respectively by taper section 28 and partition 27. Thus, front chamber 101 and expansion chamber 26 are provided, respectively, at the upstream and downstream side of partition 27.

Conduit 70 extends linearly through expansion chamber 26 from partition 27 to cover section 25. The upstream end of conduit 70 passes though partition 27 and opens inside front chamber 101. The downstream end of conduit 70 passes through cover section 25 and opens to the open air. Thus, conduit 70 only passes through expansion chamber 26 and does not pass through front chamber 101. Accordingly, conduit 70 does not pass all the way through body section 20.

A catalyst device 100 for reforming exhaust gas straddles taper section 28 and extending section 29 in front chamber 101. Exhaust gas passes from the upstream to the downstream side of catalyst device 100 while being subjected to the reaction of a catalyst in catalyst device 100.

Accordingly, exhaust gas flows first from the exhaust pipe downstream end section 11c to the section of front chamber 101 upstream from catalyst device 100. The exhaust gas then passes to the downstream side of catalyst device 100, and having been reformed by the reaction of the catalyst in catalyst device 100, flows out to the section of front chamber 101 downstream from catalyst device 100. The reformed exhaust gas flows into the upstream end of conduit 70 that is open in partition 27. The exhaust gas then flows out to expansion chamber 26 via outflow holes 72a, and into conduit 70 again via inflow holes 73a. The exhaust gas is then exhausted in to the open air from the downstream end opening of tail section 74.

Conduit 70 is structured by three inter-connecting members, namely, an upstream passage 70a, a downstream passage 70b, and a connecting section 70c. Upstream passage 70a has a head section 71 and an outflow section 72 having a side surface formed with outflow holes 72a. Downstream passage 70b has an inflow section 73 having a side surface formed with inflow holes 73a, and a tail section 74. Connecting section 70c, which is formed separately from upstream passage 70a and downstream passage 70b, has a round tubular shape with a bottom section that forms a partition wall 75. More specifically, an upstream section 76 upstream from partition wall 75, a downstream section 77 downstream from partition wall 75, and partition wall 75 are formed as separate units. The downstream end of upstream passage 70a and the upstream end of downstream passage 70b are open, and the outer diameter of the upstream end of downstream passage 70b is slightly smaller than the inner diameter of the opening of upstream passage 70a. Connecting section 70c is blocked at its upstream end by partition wall 75, and the downstream end thereof is open. The inner diameter and the outer diameter of connecting section 70c are constant in the longitudinal direction. The outer diameter of the upstream end of connecting section 70c and the inner diameter of the opening of the downstream end of upstream passage 70a are substantially equal, and the inner diameter of the downstream end of connecting section 70c and the outer diameter of the upstream end of downstream passage 70b are substantially equal. The upstream end of connecting section 70c is inserted in the opening of the downstream end of upstream passage 70a; the downstream end of upstream passage 70a and partition wall 75 of connecting section 70c are attached by welding; the upstream end of downstream passage 70b is inserted in the opening of the downstream end of connecting section 70c; and the downstream end of connecting section 70c and the upstream end of downstream passage 70b are connected by welding.

The inner diameter of upstream passage 70a is constant throughout its longitudinal direction. More specifically, inner diameter UD9 of head section 71 and inner diameter UD10 of outflow section 72 are equal. In downstream passage 70b, inner diameter DD9 of downstream section 73 is smaller than the inner diameter of upstream passage 70a, namely, inner diameter UD9 of head section 71 and inner diameter UD10 of outflow section 72. In downstream passage 70b, inner diameter DD10 of tail section 74 downstream from inflow section 73 is even smaller that inner diameter DD9 of inflow section 73. More specifically, inner diameter DD10 of tail section 74 is smaller than inner diameter UD9 of head section 71 and inner diameter UD10 of outflow section 72. The length DL10 of tail section 74 is larger than the combined length of outflow section 72 (UL10) and inflow section 73 (DL9). The length DL10 of tail section 74 is longer than the length UL9 of head section 71. The length DL9 of inflow section 73 is equal to the length UL10 of outflow section 72.

With this configuration, the inner diameter of upstream section 76 from head section 71 to outflow section 72 is maintained without size reduction. Inner diameter DD9 of inflow section 73 of downstream section 77 and inner diameter DD10 of tail section 74 are smaller as compared to the inner diameter of upstream section 76 including outflow section 72. Inner diameter DD9 of inflow section 73 is smaller as compared to inner diameter UD10 of outflow section 72, and inner diameter DD10 of tail section 74 is smaller as compared to inner diameter DD9 of inflow section 73. Accordingly, the inner diameter of downstream passage 77 reduces in a step-like manner toward the downstream side.

Sixth Embodiment

FIG. 7 is a cross sectional view of a muffler body 17 according to a sixth embodiment. Muffler body 17 is equipped to a motorcycle having structural members that are the same as in motorcycle 1 (FIG. 1), and thus a repeated explanation of these structural elements is omitted. Further, structural elements of muffler body 17 that are the same as those of muffler body 12 (FIG. 2) are denoted with the same reference numerals and a repeated explanation is omitted.

Muffler body 17 has a single conduit 80 that extends linearly through single expansion chamber 26. Conduit 80 is structured from a single pipe-shaped member having a head section 81, an outflow section 82 having a side surface formed with outflow holes 82a, an inflow section 83 having a side surface formed with inflow holes 83a, and a tail section 84. A partition wall 85, which has a round tubular shape and which is formed separately from conduit 80, is attached by welding at a central section of conduit 80 between outflow section 82 and inflow section 83. Thus, in conduit 80, an upstream section 86 upstream side from partition wall 85 and a downstream section 87 downstream side from partition wall 85 are formed as an integrated unit.

The inner diameter of conduit 80 is constant from upstream section 86 to inflow section 83 of downstream section 87. In other words, inner diameter UD11 of head section 81, inner diameter UD12 of outflow section 82, and inner diameter DD11 of inflow section 83 are equal. In contrast, in downstream section 87, inner diameter DD12 of tail section 84 downstream from inflow section 83 is smaller than inner diameter UD11 of head section 81, inner diameter UD12 of outflow section 82, and inner diameter DD11 of inflow section 83. The length DL12 of tail section 84 is larger than the combined length of outflow section 82 (UL12) and inflow section 83 (DL11). The length DL12 of tail section 84 is longer than the length UL11 of head section 81. The length DL11 of inflow section 83 is equal to the length UL12 of outflow section 82.

Seventh Embodiment

FIG. 8 is a cross sectional view of a muffler body 18 according to a seventh embodiment. Muffler body 18 is equipped to a motorcycle having structural members that are the same as in motorcycle 1 (FIG. 1), and thus a repeated explanation of these structural elements is omitted. Further, structural elements of muffler body 18 that are the same as those of muffler body 12 (FIG. 2) are denoted with the same reference numerals and a repeated explanation is omitted.

Muffler body 18 has a single conduit 90 that extends linearly through single expansion chamber 26. Conduit 90 is structured by three inter-connecting pipe-shaped members, namely, an upstream passage 90a, a downstream passage 90b, and a connecting section 90c. Upstream passage 90a includes a head section 91. Connecting section 90c has an outflow section 92 having a side surface formed with outflow holes 92a, and an inflow section 93 having a side surface formed with inflow holes 93a. Downstream passage 90b has a tail section 94. A partition wall 95, which has a round tubular shape and which is formed separately from upstream passage 90a, downstream passage 90b, and connecting section 90c, is attached by welding between outflow section 92 and inflow section 93 in a central section of connecting section 90c. Thus, in conduit 90, an exhaust gas inflow section is formed by head section 91 in an upstream section 96 upstream from partition wall 95, outflow section 92 of upstream section 96, and inflow section 93 in downstream section 97 downstream from partition wall 95. This exhaust gas inflow section, tail section 94 in downstream section 97, and partition wall 95 are formed as separate units. The downstream end of upstream passage 90a, the upstream end and the downstream end of connecting section 90c, and the upstream end of downstream passage 90b are open. The inner diameter of the opening of the upstream end of connecting section 90c is substantially equal to the outer diameter of the downstream end of upstream passage 90a, and the inner diameter of the opening of the downstream end of connecting section 90c is substantially equal to the outer diameter of the upstream end of downstream passage 90b. The downstream end of upstream passage 90a is inserted in the opening of the upstream end of connecting section 90c; the downstream end of upstream passage 90a and the upstream end of connecting section 90c are attached by welding; the open upstream end of downstream passage 90b is inserted in the opening of the downstream end of connecting section 90c; and the downstream end of connecting section 90c and the upstream end of downstream passage 90b are connected by welding.

An inner diameter of upstream passage 90a is constant throughout the longitudinal direction thereof. Inner diameter UD14 of outflow section 92 of connecting section 90c and inner diameter DD13 of inflow section 93 are equal. Inner diameter UD14 of outflow section 92 and inner diameter DD13 of inflow section 93 are larger than the inner diameter of the section upstream from outflow section 92, namely, the inner diameter of upstream passage 90a including inner diameter UD13 of head section 91. In downstream passage 90b, the inner diameter of the upstream section is smaller than inner diameter UD14 of outflow section 92 and inner diameter DD13 of inflow section 93, and is larger than inner diameter UD13 of head section 91.

In downstream passage 90b, inner diameter DD14 of head section 94 is smaller than inner diameter UD14 of outflow section 92 and inner diameter DD13 of inflow section 93, and is also smaller than inner diameter UD13 of head section 91. Thus, in conduit 90, inner diameter UD14 of outflow section 92, inner diameter DD13 of inflow section 93, inner diameter UD13 of head section 91, and inner diameter DD14 of tail section 94 become gradually smaller in that order in a step-like manner.

With this configuration, since inner diameter UD14 of outflow section 92 is larger than inner diameter UD13 of head section 91, the open hole area of outflow holes 92a formed in the side surface of outflow section 92 is increased. As a result, flow of exhaust gas from upstream section 96 to expansion chamber 26 is promoted, thereby improving engine performance while at the same time effectively reducing exhaust noise.

The invention is not limited to the examples described above. For example, the muffler body may have a plurality of expansion chambers rather than just one expansion chamber. In this case a conduit may be provided to pass through each expansion chamber. Further, the shape, number and arrangement of the outflow and inflow holes formed in the side surfaces of the conduit are not limited to those described above. In addition, the shape, number and arrangement of the outflow holes and inflow holes may be mutually the same or different. Further, the length of the tail section may be equal to the combined length of the outflow section and the inflow section.

The particular embodiments of the invention described in this document should be considered illustrative, rather than restrictive. Modification to the described embodiments may be made without departing from the spirit of the invention as defined by the following claims.

The invention claimed is:

1. A muffler comprising a conduit that passes through an expansion chamber, wherein the conduit comprises:
   a partition wall at a central section of the conduit;
   an upstream section upstream from the partition wall having an outflow section with a side surface in which outflow holes are formed that allow exhaust gas to flow out to the expansion chamber, and having a head section upstream from the outflow section, wherein an inner diameter of the upstream section is maintained without size reduction from the head section to the partition wall; and
   a downstream section downstream from the partition wall having an inflow section with a side surface formed with inflow holes that allow exhaust gas to flow in from the expansion chamber, wherein
   at least one section of the downstream section has a smaller inner diameter than the inner diameter of the outflow section,
   the upstream section is connected to the downstream section so that the upstream section and the downstream section constitute a single conduit,
   the downstream section has a tail section downstream from the inflow section,
   the conduit comprises an upstream pipe comprising the head section and the outflow section, and a downstream pipe comprising the inflow section and the tail section and connected to the upstream pipe,
   a downstream end of the upstream pipe is open,
   an upstream end of the downstream pipe has a closed end defining the partition wall, and
   the upstream end of the downstream pipe is inserted into and connected by welding to the open downstream end of the upstream pipe.

2. The muffler according to claim 1, wherein:
   the at least one section is downstream from the inflow section.

3. The muffler according to claim 1, wherein:
   the at least one section has a length equal to or greater than a combined length of the outflow and inflow sections.

4. The muffler according to claim 2, wherein:
   the at least one section is the tail section and has an inner diameter equal to an inner diameter of the inflow section.

5. The muffler according to claim 1, wherein:
   the tail section has a length greater than a combined length of the outflow and inflow sections;
   the length of the tail section is greater than a length of the head section; and
   the inflow section has a length equal to a length of the outflow section.

6. A vehicle equipped with the muffler according to claim 1.

* * * * *